United States Patent [19]

Dover

[11] Patent Number: 4,694,742

[45] Date of Patent: Sep. 22, 1987

[54] DEEP FAT FRYER

[75] Inventor: Jerome J. Dover, Blackfoot, Id.

[73] Assignee: Basic American Foods, San Francisco, Calif.

[21] Appl. No.: 815,913

[22] Filed: Jan. 3, 1986

[51] Int. Cl.⁴ .............................................. A47J 37/12
[52] U.S. Cl. ...................................... 99/404; 99/407; 99/443 C
[58] Field of Search ................ 99/353, 355, 404, 405, 99/407, 443 C, 456; 426/523

[56] References Cited

U.S. PATENT DOCUMENTS

| 2,853,937 | 9/1958 | Peck | 99/404 |
|---|---|---|---|
| 3,605,647 | 9/1971 | Beck . | |
| 3,614,924 | 10/1971 | Hickey . | |
| 3,637,401 | 1/1972 | Kuhlman . | |
| 3,771,932 | 11/1973 | Daal . | |
| 3,776,126 | 12/1973 | Veeneman et al. . | |
| 4,001,451 | 1/1977 | Veeneman et al. . | |
| 4,056,345 | 11/1977 | Shatila et al. . | |
| 4,093,125 | 6/1978 | Shatila et al. . | |
| 4,152,975 | 5/1979 | Jones . | |
| 4,228,730 | 10/1980 | Schindler | 99/404 X |
| 4,438,683 | 5/1984 | Bartfield . | |

FOREIGN PATENT DOCUMENTS 639895  7/1950  United Kingdom .................. 99/404

Primary Examiner—Robert W. Jenkins
Attorney, Agent, or Firm—Sandler & Greenblum

[57] ABSTRACT

Apparatus for preparing deep-fat fried comestibles including a conveyor for receiving comestibles as they are introduced to the fryer from a food supply and for conveying the comestibles along an arcuate path through a reservoir containing a quantity of cooking medium to cook the comestibles therein prior to draining and discharging the comestibles from the apparatus.

4 Claims, 6 Drawing Figures

DEEP FAT FRYER

BACKGROUND OF THE INVENTION

1. Field of the Invention

The present invention relates to an apparatus for deep fat frying comestibles, such as potato products including potato pieces in conventional french fry cut form. The apparatus of the present invention is particularly suitable for the timed frying of comestibles. The apparatus of the present invention is specifically adapted for use in combination with apparatus and devices for reconstituting dehydrated products into shaped pieces, particularly dehydrated potato products reconstituted as homogenous potato dough which has been divided and separated into pieces having the shape of french fry cut potato pieces prior to frying.

2. Discussion of Background and Materials Information

In the production of fried food products, it is conventional to deposit sliced vegetable products, such as potatoes, or pieces of battered and breaded food products, such as chicken and the like, in a foraminous basket which is then submerged into a vessel containing a hot oil cooking medium, such as or grease, for a predetermined period of time prior to removing the basket and draining the oil from the fried food product. The fried product is then removed from the basket and portioned into appropriate sized servings. Although batch processes may be effective for home use or in small operations, batch cooking is not particularly suitable for relatively high volume production, as is the case in a restaurant or institution, such as fast-food establishments which are now so popular.

Another disadvantage of conventional, batch-type cooking operations is that they require an attendant to monitor the cooking operation from start to finish including introducing the food product into the fryer, agitating the product during the frying process, removing the food product from the fryer when cooking is completed, and delivering the fried food product to an area for portioning into the desired servings. In addition to being time-consuming, it is often left to the discretion of the attendant to decide when these steps should be taken. Inasmuch as these are subjective determinations, usually based on sighted observations, this often leads to unacceptable results.

In an attempt to overcome the aforementioned disadvantages, there have been many attempts to develop a suitable automatic, deep-fat cooker.

U.S. Pat. No. 3,614,924, HICKEY, is a representative example of such prior art device. The deep-fat cooker has multiple, annular pocket reels for cooking food as the food products, contained within the pockets, are conveyed through the frying oil. The pockets are arranged to carry products, such as french fries, through a bath of cooking oil or fat. The product pockets are defined by transverse partitions that bridge or interconnect two flat end rings of each pocket reel. The product is fed into each pocket reel by a gravity feed chute. Each pocket reel is independently driven in order that the product it carries may have a cooking time independent of the product in the other pocket reel or reels. It is disclosed that this particular arrangement is compact and efficient in operation. The cooked product may be removed from either side of the reels.

U.S. Pat. No. 3,637,401, KUHLMAN, relates to deep-fat frying and more particularly to a method and apparatus for continuously, pressure-cooking food material in hot cooking oil. The apparatus is made up of a generally U-shaped vessel or container which is filled with heated cooking medium to establish a U-shaped column of oil. The vessel is constructed to be sufficiently large so that the oil exerts a desired pressure at the lowermost portion of the column. A continuously operating conveyor is positioned in the U-shaped vessel. The conveyor is provided with a plurality of partitions defining a continuous series of compartments for carrying food through the hot cooking oil. In operation, the conveyor carries the food material contained in each compartment downwardly into the U-shaped column of oil, thereby exposing the food material to increasing oil pressures. The temperatures in the U-shaped column and the speed of the conveyor are adjusted so that the food will be properly cooked when dispensed from the cooking vessel.

U.S. Pat. No. 4,152,957, JONES, is directed to a deep-fat fryer apparatus includes a conveyor means for receiving thin slices of potato and for conveying them along a curved path, within the fryer. The conveyor includes two belts which trap thin slices of potato therebetween for subsequent passage through the cooking oil. A removal station is positioned slightly above the cooking area of the device. This area contains the tray or other suitable receptacle for receiving the material discharged from between the conveyor belts as they exit the fryer.

U.S. Pat. No. 4,228,730, SCHINDLER et al., is directed to an apparatus for automatically frying food products. The process involves the operations of feeding, frying and discharging food. The apparatus includes an elongated reservoir for holding a predetermined amount of cooking liquid. The conveyor provided within the cooking liquid for moving the french fries or similar material during cooking includes an endless belt mounted on a horizontal transverse axis with one of the axis defining a loading end of the conveyor at a location in the reservoir to provide a generally unobstructed free-fall area below the hopper discharge aperture. The reservoir conveyor belt is generally flexible and has transverse foraminous paddles extending outwardly from the flexible belt so as to define a forward conveying path below the belt and a return path above the belt. The conveyor has longitudinally aligned first and second portions with the first portion arranged with the flexible belt disposed generally horizontally and submerged within the cooking liquid in the forward conveying path and above the liquid in the return path. The second portion of the reservoir conveyor is angled upwardly with respect to the first portion and extends out of the cooking oil to the reservoir discharge aperture.

In addition to the aforementioned representative examples of automatic, deep-fat fryers used in otherwise conventional food preparation processes, fryers have also been specifically designed for use in conjunction with apparatus and devices for reconstituting dehydrated products into a dough or similar material which can be formed into shapes suitable for frying. Typically, such reconstituted food products are less tolerant to deviations in cooking parameters such as time and temperature and, thus, require a more closely controlled frying operation which is best provided by an automatic deep-fat fryer.

U.S. Pat. No. 3,695,171, HARTLEY et al., is one example of such an integrated system which includes an automatic mixing unit including an extruder and a cooking well. The mixing unit includes a mixing bowl, paddle and means for automatically metering into the bowl a prescribed quantity of liquid required to reconstitute a dry product into an extrudable dough. The extruder includes a barrel through which the material prepared in the bowl is extruded by means of a rotatable worm which extends from the mixing bowl to the extrusion head. The cooking well is provided with at least one inclined wall and a conveyor mechanism slidably received in the cooking well. The flights of the conveyor within the cooking well are automatically set into motion upon activation of the motor powering the device. In operation, the flights move downwardly from the inclined upper wall portion of the well and then around and upwardly along the lower wall portion. During this motion they are held in an outwardly extending position by means of contact between the bottom of the wing and track on the downward run and the cam and track in the upper run. As each flight moves into a position upstream of the extrusion head, the upper surface of the flight contacts a cam member mounted on a support plate which tips the flight upwardly about its pivoted connection to the chains to form an opening into which the extruded product may drop. As each flight moves past the cam, the track assures that the flight pivots back into its normal position. As the flights move upwardly along the bottom wall portion of the well and reach the relieved portion, they tip backwardly and allow the cooked product to slide from the cooking compartment into any suitable receptacle.

U.S. Pat. No. 4,438,683, BARTFIELD, is directed to an apparatus for cooking and dispensing individual portions of fried food. The frying apparatus includes a tank filled with cooking oil into which a conveyor belt or revolving wire conveyor having a plurality of openings formed therein to prevent drainage is associated. The conveyor belt is rotated by a drive connected by a pin-and-slot or bayonet-type connection to the output shaft of a motor. The direction of rotation of the shaft is reversable to drive the belt in either a first direction in which the belt carries the food product into the tank, or in a second direction in which the belt carries cooked food product towards the outlet of the apparatus. When the belt is driven in a first direction, an end portion of the belt is moved from a first position above the level of the liquid in the tank to a second position in which the end portion extends below the level of the liquid. Rotation of the belt in the opposite direction results in the return of the submerged end portion to a position spaced above the level of the liquid within the tank. In operation, the conveyor belt carries pieces of food into the basket and ensures separation of the pieces severed during a preceding operation from those severed during a succeeding operation. After the desired number of individual pieces has been severed and cooked, the drive of the belt is reversed so as to deliver the individual heated pieces towards the outlet of the apparatus.

U.S. Pat. Nos. 3,776,126 and 4,001,451, VEENEMAN et al., commonly owned with the present application are directed to an apparatus and process for automatically and continuously, deep-fat frying food products, such as reconstituted potato dough shapes. The fryer is arranged to receive a preselected quantity of shaped potato dough pieces, retain the dough pieces in a heated zone of cooking oil for a preselected period of time, and thereafter drain excess cooking oil from the pieces and remove them from the cooking zone. The automatic deep-fat fryer is provided with rotatable, perforated rotor blades adapted to be periodically driven in a timed sequence so as to advance the potato pieces from the point of feed input to removal from the device. The rotor blades prevent the free floating potato dough pieces from sticking together as they are tumbled during the rotational advancement of the blades during the cooking process. Such tumbling simulates manual shaking, thereby ensuring complete and uniform contact of the hot oil with the surface of each food piece. In operation, a supply of potato dough pieces are deposited in a cylindrically shaped, perforate basket immersed in a tank of cooking oil. The potato dough pieces are advanced through and out of the oil bed by the rotation of one of the perforate plates. Once the cooking step has been completed, the position of the perforate plates is adjusted so that the cooked pieces are retained thereon above the hot oil for an additional period of time during which the excess oil is allowed to drain back into the cooking oil bath. Thereafter, the drained, cooked pieces of food products are mechanically removed from the perforate plate. During the draining and removal steps, rotational advancement of the perforate plate is temporarily interrupted.

As is the deep-fat fryer of the present invention, the VEENEMAN et al. apparatus is particularly suitable for use with apparatus for reconstituting dehydrated food products, such as potatoes, into an homogenous dough which is formed into appropriate shapes for deep-fat frying, such as the apparatus disclosed in U.S. Pat. Nos. 3,605,647, 3,771,937, 4,056,345, and 4,093,125, commonly owned with the present application. The disclosure of the commonly owned patents is incorporated herein by reference for disclosure of relevant subject matter.

The apparatus of the present invention is equally suited for frying all types of food products, including various potato products, such as french fries made from raw potatoes, or for the finish-frying of food products from the frozen state or after thawing of frozen, par-fried food products, and particularly potato products fabricated from potato dough made by reconstituting dehydrated potato particles and products.

SUMMARY OF THE INVENTION

The present invention is an apparatus for deep fat frying comestibles which includes a reservoir for a quantity of cooking medium; means for conveying comestibles through the cooking medium including an endless, foraminous belt provided with outwardly extending foraminous dividers forming pockets for receiving the comestibles and being constructed to have a first horizontally disposed section for receiving the comestibles and conveying the comestibles horizontally for a distance in order to permit a second batch of comestibles to be supplied to the said cooker; a second curved section for conveying the comestibles from the first section downwardly to submerge the comestibles in the cooking oil; a third horizontally disosed section for transporting the submerged comestibles through the cooking medium for a prescribed period of time to permit such comestibles to be cooked therein; a fourth vertical section for removing the comestibles from the cooking medium and permitting the cooked comestibles to drain free of excess oil; and a fifth horizontal section for conveying the cooked and drained comestibles to a discharge area located above and adjacent to the area of introduction of comestibles into the cooker.

BRIEF DESCRIPTION OF THE DRAWINGS

Other objects, features and advantage of the present invention will be more apparent after referring to the following disclosure and accompanying drawing in which:

FIG. 3 is a schematic view depicting the operation of the fryer.

Specifically.

DETAILED DESCRIPTION

Although the present invention may be specifically described hereinafter, it is done so with the understanding that the present disclosure and drawings are being provided to illustrate an example of the present invention and are not intended to limit the invention to the precise embodiment described and illustrated. Due to the simplicity and straightforward nature of the improvements of the present invention, the specific description of the components has been given for the better understanding of the invention and is not meant to limit the invention in any essential respects except as indicated herein. Along this line, certain drive mechanisms and control mechanisms which are conventional may not be fully illustrated or described but are deemed to be apparent to those having ordinary skill in the art with an understanding of the necessary functions of such elements.

For ease of description, the apparatus as well as its operation will be described in a normal operating position and terms such as horizontal, curved, upper, lower, etc. will be used in reference to this normal operating position, although such orientations may change during storing, shipping, and handling.

Figure 1:
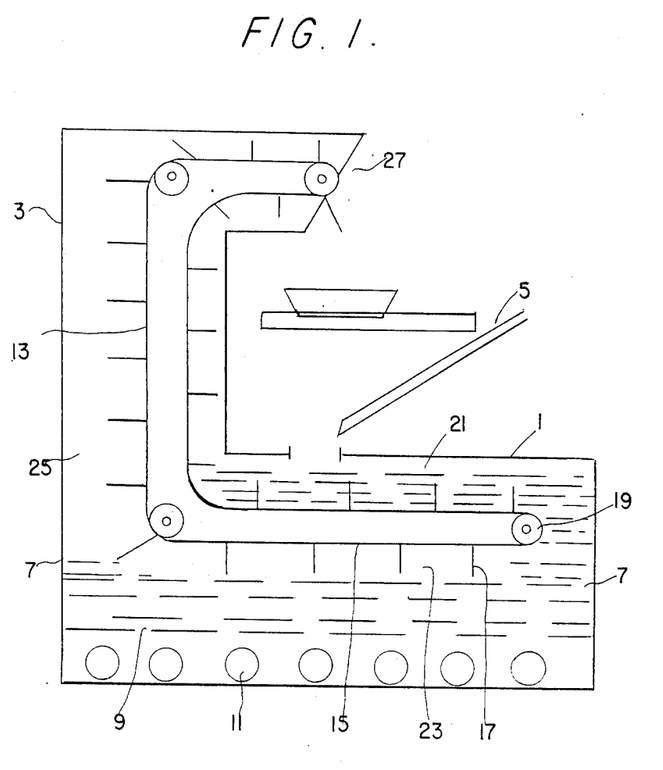
FIG. 1 is a side view of the fryer of the present invention.

Referring now to FIG. 1 of the drawings, the automatic cooking system of the present invention is generally designated as 1. The system includes the automatic deep-fat fryer 3 which forms the inventive features of the present application is positioned to receive food products to be cooked from a food supply indicated generally as 5.

The fryer 3 is composed of a tank 7 for containing the cooking medium 9, such as oil or grease. The cooking medium may be heated and maintained by any suitable means shown here as heating elements 11 positioned within the tank for maintaining the cooking medium at the desired temperature.

A conveyor 13 is provided in the tank or reservoir for transporting the food product through the hot cooking medium. The conveyor is composed of an endless belt 15 provided with outwardly projecting dividers 17 such as foraminous flights or paddles for forming partitions or pockets into which the food product may be deposited. Although volume and dimension of the pockets formed by the flights can vary, it is preferred to space the flights so as to define a volume to accommodate a serving size supply of product. As shown, the belt is driven by a plurality of sprockets 19 which are powered for rotation by a conventional drive mechanism including a motor, not shown. The belt 15 may be constructed from a flexible screen-like material capable of withstanding the high temperatures of frying, such as wire mesh, although other open networks can be used so long as the opening are sufficiently small to prevent pieces of product from passing therethrough. The belt 15 may be tensioned directly around rotatable drums or sprocket wheel 19 or may be attached on either side to a chain or other similar means which in turn to operably connected to the sprockets in a known and conventional manner.

Figure 2:
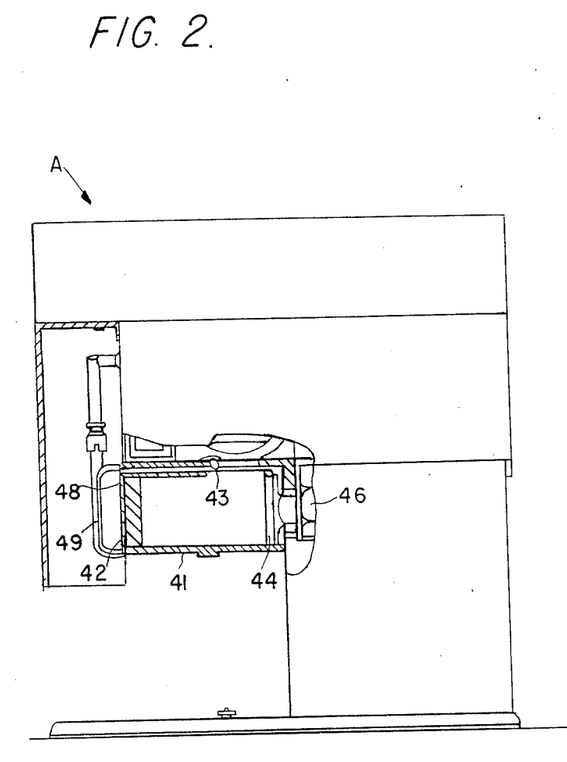
FIG. 2 is a side elevation view of a dough forming and shaping apparatus which may be used in conjunction with the fryer of the present invention.
Figure 3A:
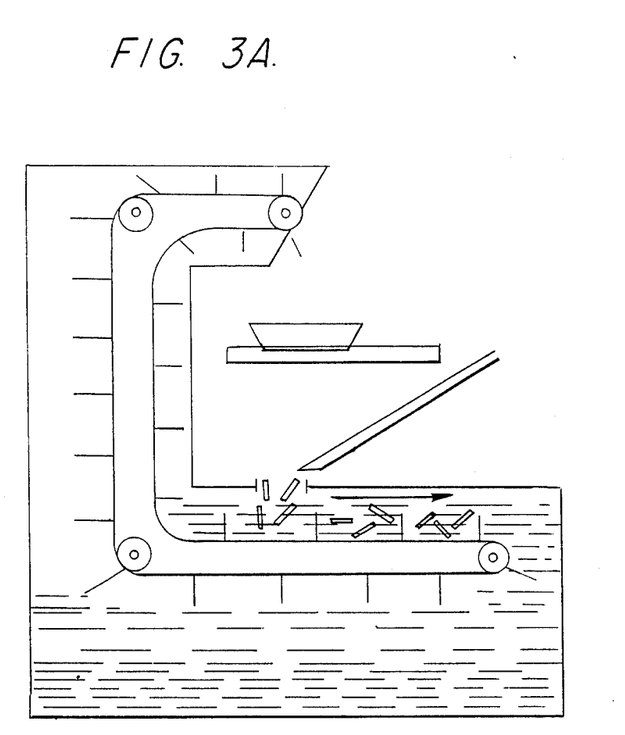
FIG. 3A shows the stage of operation of the fryer as food product is introduced and conveyed during the initial sequence of the frying operation.
Figure 3B:
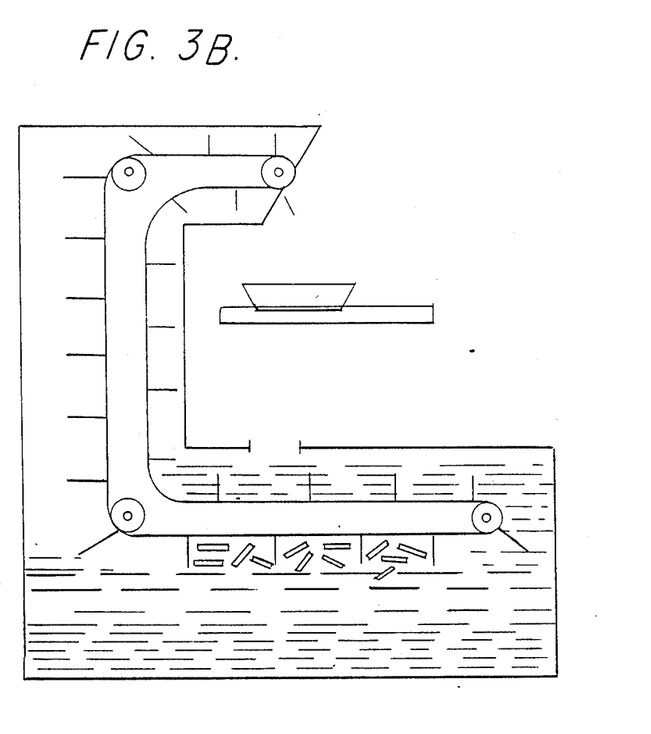
FIG. 3B shows the position of the conveyor containing portions of food product which has been advanced in a clockwise direction so as to be totally submerged in the cooking medium.
Figure 3C:
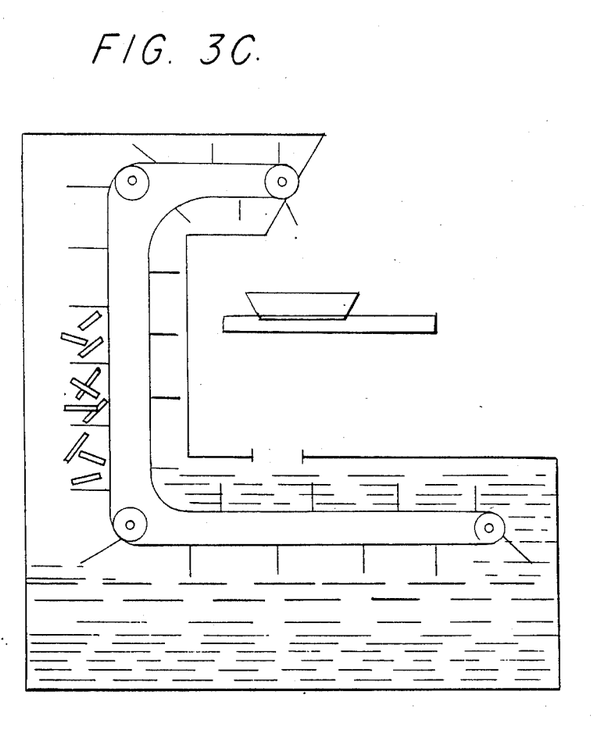
FIG. 3C shows the position of the conveyor wherein the pockets of food product have been advanced to a section of the fryer above the level of cooking medium.
Figure 3D:
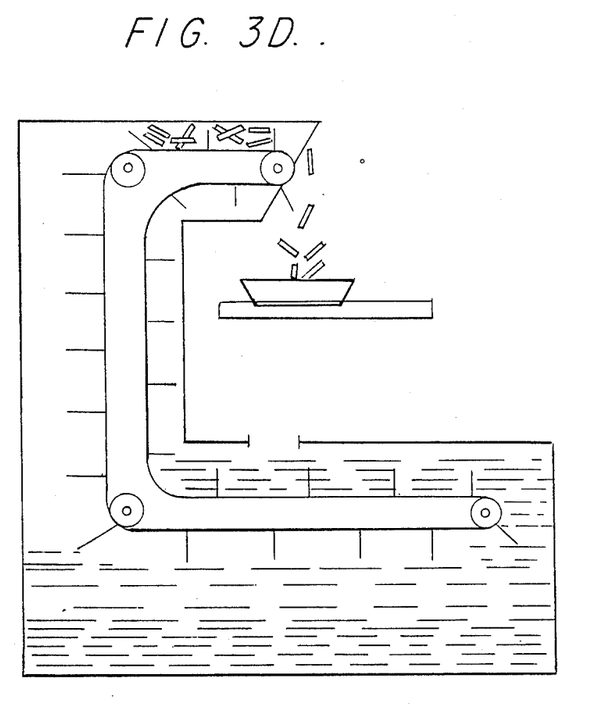
FIG. 3D shows the position of the conveyor during discharge of the food product from a pocket of the conveyor belt.

Although the fryer of the present invention may be used in conjunction with any conventional raw material supply system, it is particularly suited for use with apparatus disclosed in U.S. Pat. Nos. 3,605,647, 3,771,937, 4,056,345 and 4,093,125, and preferably may be used in lieu of the fryer in the system disclosed in U.S. Pat. No. 3,776,126, commonly owned with the present application, and shall be generally described herein in combination with such a product supply system. In this regard, a machine for forming and shaping potato dough into french fry shaped pieces which may be used for purposes of the present invention is identified generally as A. The apparatus includes a cylindrical chamber 41 having a front discharge opening 42 through which potato dough is extruded and at least one inlet opening 43 through which dehydrated potatoes and water are supplied from their respective hopper and tank (not shown), preferably located above chamber 41 within the upper regions of the apparatus. A piston 44 is slideably disposed within chamber 41 and is reciprocally driven towards and away from the discharge opening by a drive mechanism generally shown as 46. A dough divider 48 is generally shown as being mounted around the front discharge opening 42 of chamber 41. A dough separator 49 is operably connected to the apparatus to move back and forth transversely across the exterior face of the dough divider in windshield wiper fashion to separate pieces of divided dough or dough bodies 50 as the dough protrudes from chamber 41 through divider 42.

As explained in considerable detail in the abovementioned patents, potato dough is formed within chamber 41 by introducing dehydrated potatoes, such as the potato agglomerates made in accordance with U.S. Pat. No. 3,622,355, and water from their respective hopper and tank through the inlet opening 43 provided therefor to uniformly wet the potato agglomerates which after a suitable time sets up into a firm dough. Once this condition has been achieved, the piston 44 may be activated to push the dough ouf of chamber 41 through dough divider 48 for separating into shaped pieces by the action of dough separator 49. During the introduction of product and water, the discharge opening 42 of chamber 41 may be sealed to prevent leakage of water until the dough sets up by mounting a plate across the front of the opening during the initial charging of the machine or by stopping the advancement of the piston to retain a plug of dough at the opening during subsequent production.

Turning now more specifically to the fryer of the present invention, conveyor 13 is designed to have an upper generally horizontal section 21 for receiving food products provided by the supply and moving the products through a second section which curves downwardly into a lower horizontal third section 23 located below the first horizontal section. In this position, food product is totally submerged and cooked for a prescribed period of time. A fourth section 25 of the conveyor is positioned vertically so as to remove the food product from the cooking medium and permit the fried food product to drain during its passage to a fifth section horizontally disposed above the first section and terminating in an elevated discharge area 27 positioned generally above but in close proximity to the area of introduction of food product into the fryer. Suitable conventional timing circuits (not shown) are provided to coordinate the action of the dough separator, and the delivery conveyor with the movement of the transport conveyer though the oil when the potato dough pieces are released by the dough separator and are delivered to the fryer. In this regard, after the pockets which have been supplied with product are conveyed to the third horizontal section of the fryer, the movement of the belt is interrupted for between about 85 ∝ 110 seconds to permit the submerged product to cook.

As shown schematically in FIG. 3, the operation of the device will now be described with respect to reconstituted potato dough pieces to illustrate the operation of the apparatus of the present invention. The dough containing chamber 41 and the cutting mechanism 49 are activated to provide dough bodies 50 to the fryer 3. If the fryer is positioned immediately below the discharge opening 42 adjacent chamber 41, the pieces may be permitted to fall by gravity directly into the fryer. Alternatively, however, the pieces separated from the divided dough may be deposited first onto a conveyor, which may simply be a chute, to help keep the pieces separate to minimize the tendency of the pieces to stick together as they are delivered to the fryer. In this manner, the potato dough pieces are supplied to the pockets formed between dividers 17 of the conveyor belt 15 in the first horizontal section of the fryer. The conveyor is then rotatably advanced in a clockwise direction and downwardly through the curved section to totally submerge the food product contained within the pockets below the surface of the cooking oil in the third horizontal section 23 of the fryer. In this position, the advancement of the conveyor is interrupted to permit the food products to cook in the frying oil. After a prescribed period of time, such as 85-110 seconds, the belt is then advanced so as to transport the cooked food product into the vertical section of the cooker and upwardly therethrough to a location above the surface of the hot cooking medium while oil drains from the food products. Once the draining operation has been completed during the passage of the food product through the vertical section of the cooker, the conveyor is then advanced through an elevated horizontal position to a discharge area which is preferably positioned essentially above the area for introduction of the food product into the cooker. A receptacle, such as a basket or other suitable container for the food product, is positioned at the adjacent discharge outlet of the cooker receive the cooked and drained food products therefrom.

From the foregoing description, one skilled in the art can easily ascertain the essential characteristics of this invention and, without departing from the spirit and scope thereof, can make various changes and modifications of the invention to adapt it to various usages and conditions.

I claim:

1. An apparatus for deep fat frying comestibles comprising:
    (a) a reservoir for containing a quantity of cooking medium;
    (b) means for heating said cooking medium;
    (c) means for conveying comestibles through said cooking medium, said means for conveying having:
        (i) a first section horizontally disposed for receiving said comestibles and conveying said comestibles horizontally for a prescribed distance in order to permit a second batch of comestibles to be supplied to said apparatus;
        (ii) a second section adjacent said first section, said second section being curved for conveying comestibles downwardly to submerge said comestibles in said cooking medium;
        (iii) a third section horizontally disposed adjacent said second section and located directly below said first section for transporting said submerged comestibles through the cooking medium for a prescribed period of time;
        (iv) a fourth section vertically disposed adjacent said second section for removing the comestibles from the cooking medium and permitting the comestibles to drain free of excess cooking medium; and
        (v) a fifth section adjacent said fourth section and horizontally disposed above said first section for conveying the cooked and drained comestibles to a discharge area located above and adjacent to the area of introduction of food product into said first section.

2. An apparatus according to claim 1, wherein said means for conveying comprises a continuous belt associated with a means for driving said belt.

3. An apparatus according to claim 2 wherein said belt is provided with outwardly extending dividers.

4. An apparatus according to claim 1 wherein said reservoir is provided with a cover, said cover having a product inlet port positioned above said first section and a product discharge port positioned at the end of said fifth section and located directly above said inlet port.

* * * * *